(12) United States Patent
Achiam et al.

(10) Patent No.: US 7,483,600 B2
(45) Date of Patent: Jan. 27, 2009

(54) INTEGRATED COHERENT OPTICAL DETECTOR

(75) Inventors: Yaakov Achiam, Rockville, MD (US); Isaac Shpantzer, Bethesda, MD (US); Arthur Greenblatt, Silver Spring, MD (US); Geoffrey Harston, Laurel, MD (US); Arkady Kaplan, Rockville, MD (US); Pak Shing Cho, Gaithersburg, MD (US)

(73) Assignee: CeLight, Inc., Silver Spring, MD (US)

( * ) Notice: Subject to any disclaimer, the term of this patent is extended or adjusted under 35 U.S.C. 154(b) by 25 days.

(21) Appl. No.: 11/672,372

(22) Filed: Feb. 7, 2007

(65) Prior Publication Data

US 2007/0140613 A1 Jun. 21, 2007

Related U.S. Application Data

(63) Continuation-in-part of application No. 10/669,130, filed on Sep. 22, 2003, now Pat. No. 7,327,913, and a continuation-in-part of application No. 11/610,964, filed on Dec. 14, 2006, now Pat. No. 7,397,979, and a continuation-in-part of application No. 10/613,772, filed on Jul. 2, 2003, now Pat. No. 7,272,271.

(51) Int. Cl.
*G02B 6/12* (2006.01)

(52) U.S. Cl. .................................................. 385/14
(58) Field of Classification Search ............... None
See application file for complete search history.

(56) References Cited

U.S. PATENT DOCUMENTS 5,060,312 A * 10/1991 Delavaux .................... 398/204
5,559,915 A *  9/1996 Deveau ........................ 385/49

* cited by examiner

*Primary Examiner*—Michelle R. Connelly-Cushwa
*Assistant Examiner*—Chris Chu
(74) *Attorney, Agent, or Firm*—Nadejda Reingand

(57) ABSTRACT

The present invention provides an integrated device and a method of its fabrication and use. Two parts of the device each having an electronic circuit are aligned adjacent to each other with an accuracy of at least 1 micron. An alignment system includes two parts: a first part integrated with the first electronic circuit of the integrated device on the first substrate and a second part integrated with the second electronic circuit of the integrated device on the second substrate. The second part of alignment system includes at least one photodiode. The maximal value of the photodiode current indicates the best alignment of two parts of the integrated device. In one embodiment the integrated device is a coherent optical detector for high speed optical communications and chemical sensing. In another embodiment the integrated optical device is a coherent optical detector operating in two polarization states of light.

27 Claims, 6 Drawing Sheets

INTEGRATED COHERENT OPTICAL DETECTOR

CROSS-REFERENCE TO RELATED APPLICATIONS

This application is a continuation-in-part of Ser. No. 10/669,130 filed Sep. 22, 2003 now U.S. Pat. No. 7,327,913. This application is also a continuation-in-part of Ser. No. 11/610,964, filed Dec. 14, 2006 now U.S. Pat. No. 7,397,979 and Ser. No. 10/613,772, filed Jul. 2, 2003 now U.S. Pat. No. 7,272,271, all of which applications are fully incorporated herein by reference.

FIELD OF THE INVENTION

This invention relates generally to integrated devices and their fabrication and use, and more particularly to electro-optical receiving devices being used for coherent detection of optical signals in optical communications and remote sensing.

BACKGROUND OF THE INVENTION

Lasers are widely used today in fiber and free space segments for high data rate communication links, remote sensing applications (LIDAR) and more. In these applications the modulated light signal is modulated using electro-optical modulators and demodulated using, usually, electro-optical receiving devices.

In optical communications the modulation scheme commonly used is On-Off Keying (OOK), where only the power of the light is modulated. Alternative modulation schemes include Phase Shift Keying (PSK), where the data is encoded in the phase of the signal. Three types of PSK modulation are currently used in optical communications: Binary Phase Shift keying (BPSK), Quadrature Phase Shift Keying (QPSK) and Quadrature Amplitude Modulation (QAM).

By using such communication schemes, for example, in optical communication systems, the capacity and link performance can be greatly enhanced in comparison with the direct detection schemes. In LIDAR, which is the extension of radar to the optical domain, the required shaping of the pulses can be achieved, such as chirped pulses, Barker coding, etc.

For these applications and others, the light should be modulated both in amplitude and phase, essentially with a complex modulation signal. There is a need in compact, reliable, and low-cost receivers for such advanced modulating schemes.

At the receiver the received optical signal is mixed with the local oscillator signal by an optical interface that is usually based on one or more optical hybrids, such as directional hybrids, polarization splitters, and 90-degrees balanced hybrids. At the output from the optical interface, the optical field is converted into electric currents by one or more PIN photodiodes.

If the local oscillator and the received optical carrier have the same frequency, the electric currents provided by the photodiodes are baseband signals and the receiver is of the homodyne type. Respectively, if the local oscillator and the received optical carrier have different frequencies, the electric currents are shifted to the intermediate frequency (IF).

The present invention relates generally to the integrated phase diversity and polarization diversity optical receiver designated to detect the optical signal, to mix it with another optical signal, to transform the signal into electrical domain for further processing. The present invention also addresses methods of the device fabrication and use.

Optical devices currently available are based on non-integrated and/or semi-integrated solutions, i.e. optical fibers or optical fiber-based components are used for connecting of various electro-optical components and/or splitting/combining the optical signals. An integrated solution for the device that are capable to provide an arbitrary format demodulation (phase and/or amplitude modulation) is disclosed in co-pending U.S. patent application Ser. Nos. 10/669,130 and 11/610,964 commonly owned with the present application, both incorporated herein by references.

The coherent detector in '130 and '964 is an active device integrated on a single chip combined with series of photodetectors. An array of photodetectors need to be precisely positioned relatively the outputs of the optical interface of the receiver. In passive integrated devices, the photodetector alignment may be performed by light transmission through the integrated waveguide and its detection by the photodetector. Maximal intensity of the photodiode current corresponds to the best alignment. This approach is not applicable to active integrated devices. The photodiodes need to be aligned before the device activation. The intensity of the light passing through waveguides is different in the device in active state and the device in non-activated state. The best alignment of the photodiodes for the optical receiver in non-activated state differs from their best positioning in the active device. Proper alignment of the integrated device output waveguides with the photodetectors is crucial for the device performance. There is a need to simplify the alignment during the manufacturing process.

SUMMARY OF THE INVENTION

Accordingly, an object of the present invention is to provide an integrated optical device and its methods of manufacturing for precise alignment of two parts of the device being adjacent to each other; an optical interface and a receiving unit.

Yet another object of the present invention is to provide an electro-optical optical device and its methods of manufacturing for precise alignment of an optical interface and receiving unit being two parts of the device, where the receiving unit includes an array of photodiodes.

Yet another object of the present invention is to provide an integrated single monolithic adjustable device to demodulate optical signals having two polarization states for quadrature phase shift keying (BPSK and/or QPSK) optical data communication applications.

Still another object of the present invention is to provide an integrated single monolithic adjustable device to demodulate optical signals for LADAR as well as other remote sensing applications.

In one embodiment of the present invention, these and other objects of the present invention are achieved in an optical device having an optical interface, a receiving unit. The optical interface consisted of an interface circuit and a first alignment system, and the receiving unit consisted of a receiving circuit and a second alignment system.

In the preferred embodiment, the interface circuit has a first, a second and an alignment inputs. A first coupler is coupled to the first input and produces at least a first and second output. A second coupler is coupled to the second input and produces at least a first and second output. A third coupler is coupled to the first output of the first coupler and to the first output of the second coupler. A fourth coupler is coupled to the second output of the first coupler and to the second output of the second coupler. First and second crossing waveguides are provided with an angle selected to minimize crosstalk and losses between the first and second cross waveguides. The first crossing waveguide connects one of the first or second outputs from the first coupler with an input of the fourth coupler. The second crossing waveguide connects one of the first or second outputs from the second coupler with an input of the third coupler. A first phase shifter is coupled to the first and second waveguides. The first and second waveguides connect one of the outputs of the first or second coupler and one of the inputs of the third or fourth couplers. The first, second, third and fourth couplers, the two crossing waveguides and the phase shifter are each formed as part of a single planar chip made of an electro-optical material.

In one embodiment the first alignment system includes a single alignment waveguide and the second alignment system includes a single alignment photodiode. The waveguide is formed as a part of the single planar chip on which the optical interface is formed. The alignment photodiode is formed as a part of the receiving unit.

In one embodiment the receiving unit has at least four receiving photodiodes in an array and additional alignment photodiode formed on a single substrate.

In another embodiment of the present invention, the interface circuit has first, second, and third inputs. The interface circuit includes a first coupler coupled to the first input and producing at least a first and second output; a second coupler coupled to a second input and producing at least a first and second output; a third coupler coupled to the first output of the first coupler and to the first output of the second coupler; a fourth coupler coupled to the second output of the first coupler and to the second output of the second coupler, first and second crossing waveguides with an angle selected to minimize crosstalk and losses between the first and second cross waveguides, the first crossing waveguide connecting one of the first or second outputs from the first coupler with an input of the fourth coupler, the second crossing waveguide connecting one of the first or second outputs from the second coupler with an input of the third coupler; a first phase shifter coupled to first and second waveguides, the first and second waveguides connecting one of the outputs of the first or second coupler and one of the inputs of the third or fourth couplers, a fifth coupler coupled to the second input and producing at least a first and second output; a sixth coupler coupled to a third input and producing at least a first and second output; a seventh coupler coupled to the first output of the fifth coupler and to the first output of the sixth coupler, an eighth coupler coupled to the second output of the fifth coupler and to the second output of the sixth coupler, third and fourth crossing waveguides with an angle selected to minimize crosstalk and losses between the third and fourth cross waveguides, the third crossing waveguide connecting one of the first or second outputs from the fifth coupler with an input of the eight coupler, the second crossing waveguide connecting one of the first or second outputs from the sixth coupler with an input of the seventh coupler, a third phase shifter coupled to third and fourth waveguides, the third and fourth waveguides are connected to one of the outputs of the fifth or sixth coupler and one of the inputs of the seventh or eighth coupler, wherein the first, second, third, fourth, fifth, sixth, seventh and eighth couplers, the two sets of crossing waveguides and the phase shifters are each formed as part of a single planar chip made of an electro-optical material.

In another embodiment of the present invention, a method of the integrated device alignment uses the alignment system to precisely position the optical interface and the receiving unit. The method maximizes intensity of the output signal from the alignment waveguide by measuring current of the alignment photodiode.

In another embodiment of the present invention, a high bit rate optical communication system includes a transmitter and a receiver. The receiver includes the alignment system.

DETAILED DESCRIPTION OF THE PREFERRED EMBODIMENTS

Figure 1:
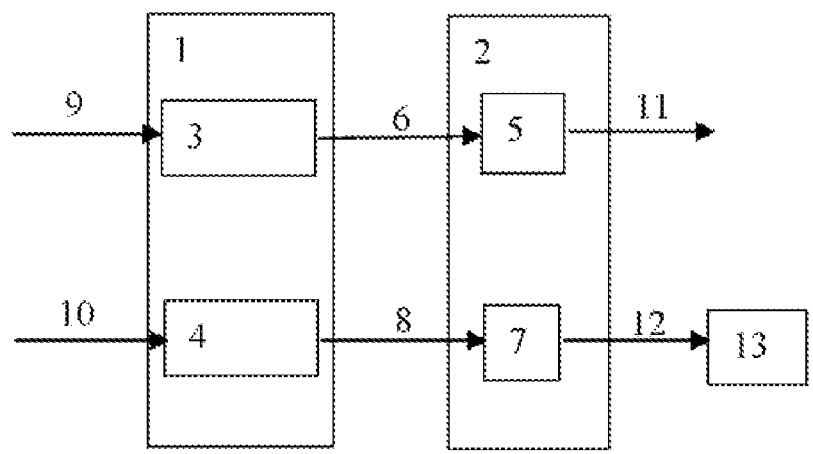
FIG. 1 is a schematic diagram of an integrated device consisted of two parts on two substrates, the device having an alignment system for precise alignment of the two parts during manufacturing.

In one embodiment of the present invention, an optical device, such as optical device illustrated in FIG. 1, hereafter referred as Optical Device, is provided that includes an optical interface 1 and a receiving unit 2.

The interface 1 includes an interface circuit 3 and a first alignment system 4. The receiving unit 2 contains a receiving circuit 5 for receiving at least one output signal 6 from the interface circuit 3 and a second alignment system 7 for receiving at least one output signal 8 from the first alignment system 4.

In one embodiment the interface circuit is an electro-optical device. It is known that alignment of output waveguides from the electro-optical (EO) device with inputs of receiving circuit is a complicated task. The inputs have to be positioned and attached prior to the EO device activation.

In case when the receiving circuit 5 contains a set of photodiodes, the alignment is still very difficult. A simple procedure of directing light through the EO device and the receiving circuit, measuring the photodetector current and selecting optimal position which corresponds to the maximal photodetector current is not applicable. If the electro-optical device is not activated, it may not produce enough light at the outputs to align the receiving circuit with photodetectors.

The solution is in integrating an alignment system together with the electro-optical device on a single chip. The alignment system 4 is integrated on the same chip as the interface circuit 3 at a distance L, which is known with accuracy of at least 1 micron. The second alignment system 7 is positioned at the same substrate as the receiving circuit 5 at the same distance L, which is also known with accuracy of at least 1 micron. In the preferred embodiment the accuracy is about 0.1 micron.

In one embodiment the alignment system (FIG. 1) is a straight waveguide 4 connecting an input 10 with the output 8. The second alignment system 7 is a single photodiode that receives light coming out of output 8. The maximal value of current measured by measuring system 13 corresponds to the best position of the receiving unit 2 relative to the optical interface 1. Keithley 236 Source Measure Unit produced by Keithley Instruments, Inc. (Cleveland, Ohio) is an example of the measuring system 13. Since the distance between the alignment system and the electro-optical device is precisely equal to the distance between the receiving circuit and the second alignment system, the best positioning of the receiving circuit 5 is achieved.

In one embodiment the receiving unit 5 is a set of PIN photodiodes or at least one PIN photodiode, and the second alignment system 7 is a single PIN photodiode. All photodiodes are formed as a part of a single substrate. The photodiodes may be spaced a certain equal distance apart. In the preferred embodiment the distance between photodiodes is less than 200 micron.

Figure 2:
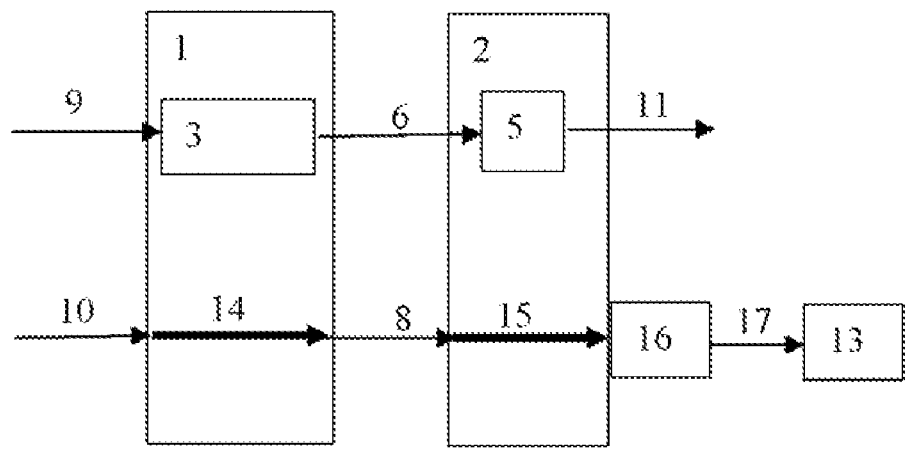
FIG. 2 An example of the alignment system being implemented in an integrated optical device.

In another embodiment the receiving unit 5 is an arbitrary electronic circuit, which needs to be aligned relative to the interface circuit 3. A first straight waveguide 14 can serve as a first alignment system 7 (FIG. 2). The second alignment system may be built as a combination of a straight waveguide 15 with a PIN photodiode 16 attached to the waveguide 15 and to the measuring system 13 by fiber connection 17. The alignment is performed by moving the receiving unit in the direction essentially perpendicular to the waveguide 14 and choosing the position where the measuring system 13 indicates the maximum of photodiode 16 current.

Figure 3:
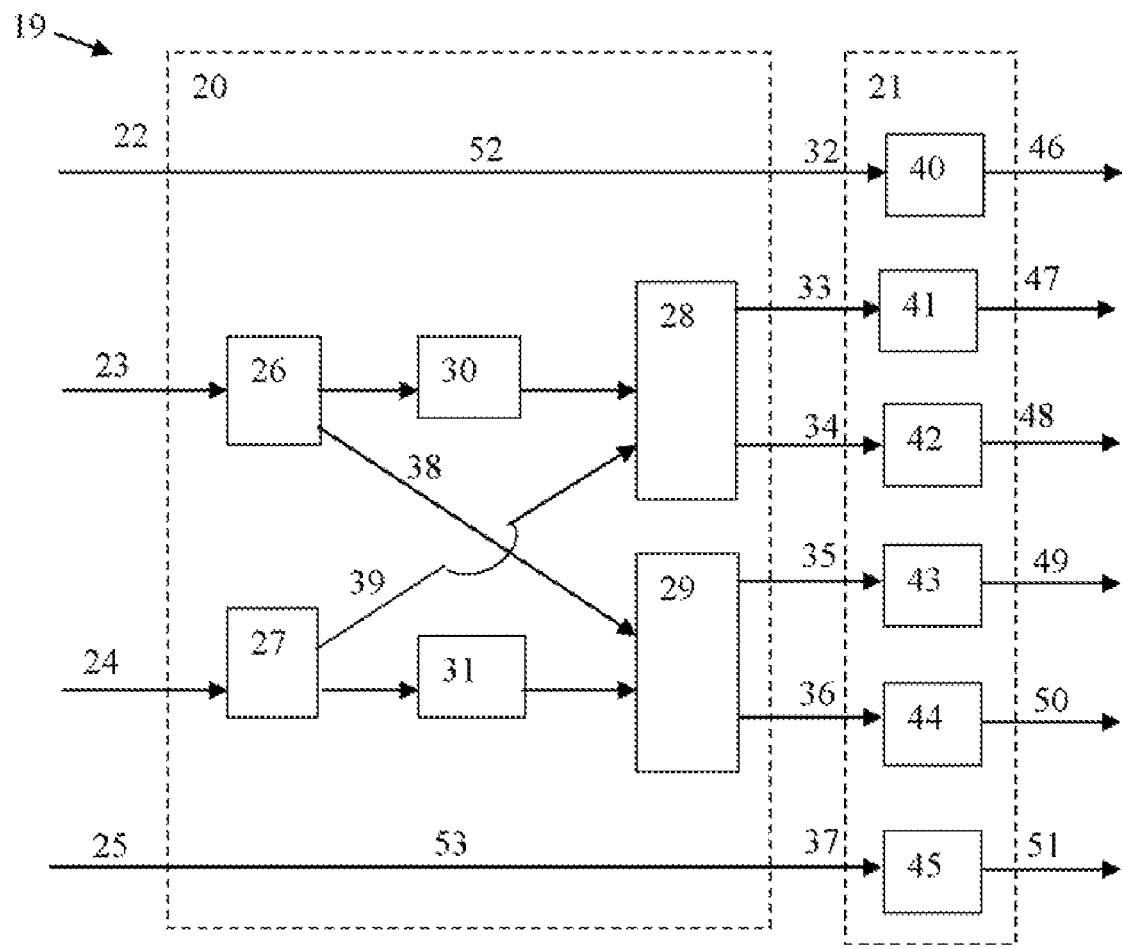
FIG. 3 is a schematic diagram of a coherent optical receiver with an alignment system of the present invention.

One of the embodiments of the Optical Device is shown in FIG. 3. It includes an optical interface 20 and a receiving unit 21. The interface includes a first device input 22, a second device input 23, a third device input 24, a fourth device input 25, first 26, second 27, third 28 and fourth 29 couplers (mixers); a first phase shifter 30 and a second phase shifter 31, and first 32, second 33, third 34, fourth 35, fifth 36, and sixth 37 device outputs. The optical interface further includes two crossing waveguides 38 and 39, which cross each other. The receiving unit 21 includes six photodetectors 40, 41, 42, 43, 44 and 45 having outputs 46, 47, 48, 49, 50 and 51 respectively.

The second 23 and the third 24 device inputs both are connected, respectively, to the first coupler 26 and the second coupler 27. One output of the first coupler 26 is connected to one input of the third coupler 28 while another output of the first coupler 26 is connected to the one input of the fourth coupler 29 by a first crossing waveguide 38. An output of the second coupler 27 is connected to another input of the fourth coupler 29 while another output of the second coupler 27 is connected to another input of the third coupler 28 by a second crossing waveguide 39. The optical interface also includes at least one phase shifter positioned between two locations. The first location is one of the outputs of the first or second coupler. The other location is one of the inputs of the third or fourth couplers, which corresponds (connected by a crossing waveguide) to the first location. The first and second outputs of the third coupler 28 produce the second 33 and third 34 device outputs, respectively. The first and second outputs of the fourth coupler 29 produce the fourth 35 and fifth 36 device outputs, respectively. Alignment waveguides 52 and 53 produce the first output 32 and the sixth output 37, respectively.

Signals coming out of the six outputs 32, 33, 34, 35, 36, and 37 impinge photodetectors 40, 41, 42, 43, 44 and 45, respectively. It is preferred that the photodetectors are PIN photodiodes. The photodiodes are located at equal distance apart. The distance between the neighbor photodiodes can be from 0.01 to 1 mm. In the preferred embodiment the distance is from 0.1 to 0.2 mm. The array of the photodiodes is fabricated on top of a single substrate. InGaAs photodiodes produced by OSI Optoelectronics, Inc. (Hawthorne, Calif.) are examples of such photodiodes. In the preferred embodiment the substrate is made of alumina. The optical interface 20 alignment relatively the receiving unit 21 is performed by light passing through waveguides 52 and 53 and positioning the unit 21 to maximize the current from photodiodes 40 and 45. The accuracy of alignment is at least 1 micron. In the preferred embodiment the accuracy is about 0.1 micron.

The alignment system of the optical device 19 in FIG. 3 has two waveguides 52 and 53 in the first alignment system and two photodiodes 40 and 45 in the second alignment system. Though it seems excessive to have two sets of waveguide-plus-photodiode alignment elements, the experimental results of the device testing demonstrate improved characteristics of the devices with such configuration versus the device having just a single waveguide-plus-photodiode alignment element.

Figure 4:
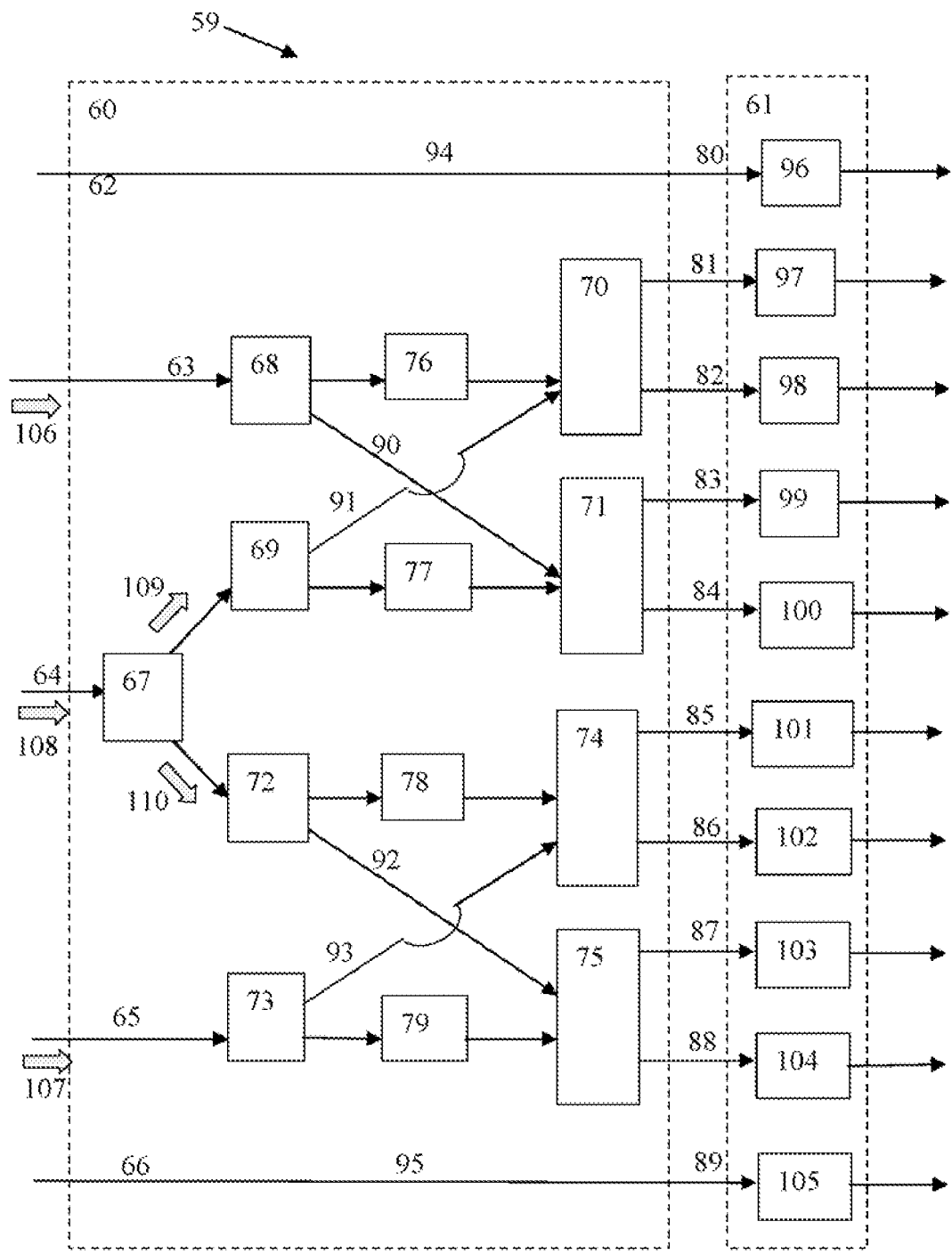
FIG. 4 is a schematic diagram of a polarization diversity coherent optical receiver operating with the light in two (orthogonal) polarization states.

In another embodiment of the present invention, an Optical Device, such as optical device illustrate in FIG. 4, is provided that includes an optical interface 60 and a set of photodiodes 61. The interface includes a first device input 62, a second device input 63, a third device input 64, a fourth device input 65, a fifth device input 66; a polarization beam splitter 67, first 68, second 69, third 70, fourth 71, fifth 72, sixth 73, seventh 74, and eighth 75 couplers (mixers); a first phase shifter 76, a second phase shifter 77, a third phase shifter 78, and a fourth phase shifter 79, first 80, second 81, third 82, fourth 83, fifth 84, sixth 85, seventh 86, eighth 87, ninth 88, and tenth 89 device outputs. The device further includes two sets of crossing waveguides (90 and 91) and (92 and 93). Two alignment waveguides 94 and 95 are located on opposite sides of the optical interface 60.

Signals coming out of the ten outputs 80, 81, 82, 83, 84, 85, 86, 87, 88, 89 impinge photodetectors 96, 97, 98, 99, 100, 101, 102, 103, 104, 105, respectively. It is preferred that the photodetectors are PIN photodiodes. Similarly to the device in FIG. 3, the photodiodes are located at equal distance apart. The distance between the neighbor photodiodes can be from 0.01 to 1 mm. In the preferred embodiment the distance is from 0.1 to 0.2 mm. The optical interface 60 alignment relatively the photodetector unit 61 is performed by light passing through waveguides 94 and 95 and positioning the unit 61 to maximize the current from photodiodes 96 and 105. The accuracy of alignment is at least 1 micron. In the preferred embodiment the accuracy is about 0.1 micron.

The elements in the optical interfaces 20 and 60 can each be formed as part of a single planar chip made of an electro-optical material. A variety of different processes are utilized in making the single planar chip, as disclosed in R. C. Alferness in "Ti Diffused LiNbO$_3$ waveguide devices"; "Guided Wave Opto-electronics", Ed. T. Tamir, Springer-Verlag, 1988; and Wei-Lin Chen, et al. "Lithium Niobate Ridge Waveguides by Nickel Diffusion and Proton-Exchange and Wet Etching", IEEE Photonics Technology Letters Vol. 7 No. 11, 1995, all incorporated herein by reference.

In various embodiments, the chip is a monolithic piece of a wafer that can be made of semiconductor or ferroelectric materials including but not limited to LiNbO$_3$, and the like. In various embodiments, different effects relative to the output of the chip of the present invention are possible, including but not limited to, (i) thermo-optical, (ii) electro-optical, (iii) electro-absorption, and the like can be utilized with the Optical Device. The electro-optical material, which can be LiNbO$_3$, can be cut at X, Y, or Z planes. The Optical Device of the present invention can utilize a variety of different processes in its creation, including but not limited to, metal in-diffusion and/or (annealed) protonic-exchange technology, wet etching, reactive ion (beam) etching, plasma etching, and the like.

Integration of components in a single chip, such as LiNbO$_3$ and the like, can, among other things, reduce cost, improve performance, and provide better stability and control. The optical interfaces 20 and 60 of the present invention, when integrated on a single chip and/or in single package, can be used for various applications, including those that require simultaneous measurement of phase and amplitude of the optical field. In the preferred embodiment the receiving units 21 and 61 include the balanced receivers and optionally Trans-Impedance Amplifiers (TIAs), all formed as a part of a single integrated package.

Alternatively the integrated device chip can be made of the semiconductor material selected from Si and InP.

In one embodiment of the present invention, the optical input of the Optical Device has an input signal that is modulated in phase/amplitude, such as by way of illustration, quadrature phase shift keying (QPSK) or quadrature amplitude modulation (QAM), for communications, or controlled chirp or Barker coding for LADAR applications.

The Optical Device in FIG. 4 provides polarization independent signal demodulation in coherent optical communications. An input data signal in one polarization state 106 enters the Optical Device by input 63, while an input data signal in another (orthogonal) polarization state 107 enters by input 65. Inside the Optical Device both signals are mixed with local oscillator signals having the same polarization states. A local oscillator signal 108 having two polarization states enters the Optical Device by input 64. The local oscillator signal 108 is split by polarization beam splitter 67 into two beams 109 and 110. The beam 109 has the same polarization state as the beam 106, and the beam 110 has the same polarization state as the beam 107.

The detailed analysis of the signal demodulation in coherent optical receiver is disclosed in co-pending U.S. patent application Ser. Nos. 10/669,130 and 11/610,964 by the same inventors, fully incorporated herein by reference. The alignment system does not participate in the Optical Device operation on the stage of signal demodulation, it only used on thee stage of the device fabrication. The alignment system and the interface circuit operate in non-overlapping time frames.

The Optical Device of the present invention can be utilized for wavelength selectivity by filtering optical signals in the electrical domain. In various embodiment, the Optical Device of the present invention can be utilized in a variety of different of applications and field, including but not limited to photonics and opto-electronics: communications, LADARs, sensing, and the like. In various embodiments, the Optical Device of the present invention can be utilized to provide inherent frequency selectivity and enables the incorporation of wavelength agility, by way of illustration into a communications link, without reliance on narrowband tunable optical filters. With the Optical Device of the present invention, the preservation of signal phase information, in the electrical domain, enables the implementation of a digital polarization diversity receiver without reliance on optical components, thus making polarization multiplexing and polarization agility implementable.

Figure 5:
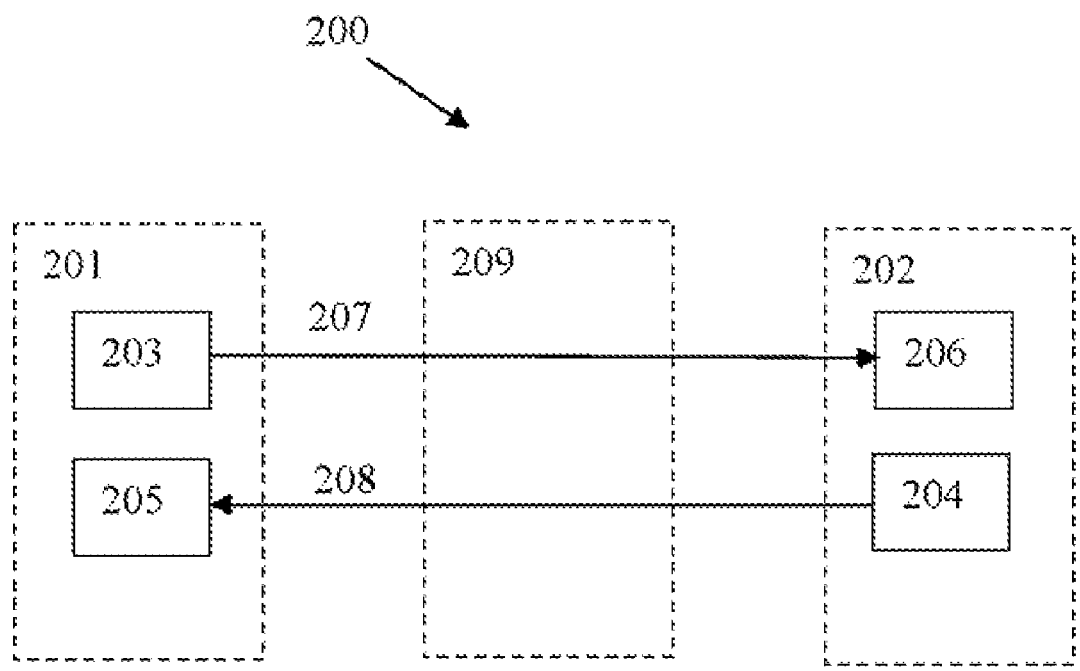
FIG. 5 is a schematic diagram of an optical communication system of the present invention.

Referring now to FIG. 5, a block diagram of a communication system 200 is shown, where 201 and 202 are transceivers that include transmitters 203, 204 and coherent receivers 205 and 206, correspondingly. Transceivers 201 and 202 are located at certain distances from each other, and light beams 207 and 208 pass a transmission medium 209 including but not limited to fiber, air, space, and the like before it reaches the opposite transceiver 201 or 202 respectively.

Figure 6:
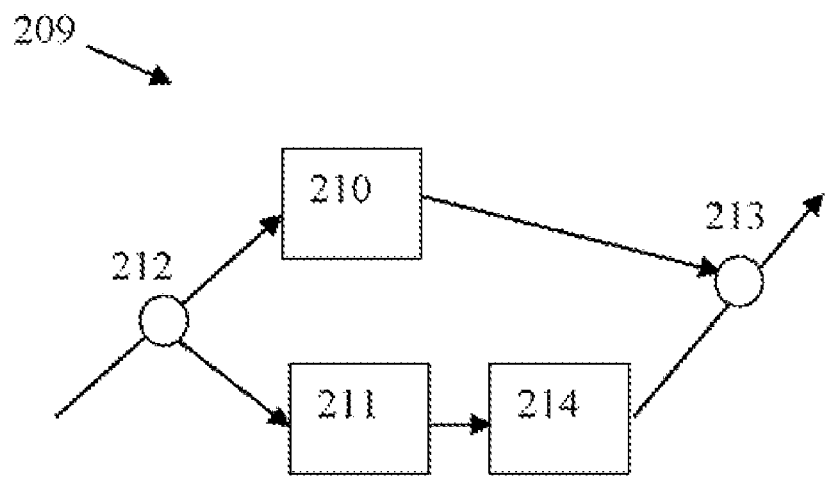
FIG. 6 is a schematic diagram of a quadrature modulator for optical communications.

In one embodiment, transmitters 203 and/or 204 from FIG. 5 are optical devices as disclosed in co-pending application Ser. No. 10/613,772, commonly owned with the present application, filed Jul. 2, 2003, incorporated by reference. The transmitter 209 is shown in FIG. 6, it includes a first Mach-Zehnder modulator 210 that produces a first output, and a second Mach-Zehnder modulator 211, which produces a second output. The first and second Mach-Zehnder modulators 210 and 211 are coupled to an input splitter 212. A combiner 213 combines the first and second outputs from first and second Mach-Zehnder modulators 210 and 211. A phase shifter 214 is coupled to the first and/or second Mach-Zehnder modulators 210 and 211. The first Mach-Zehnder modulator 210, second Mach-Zehnder modulator 211, input splitter 212, combiner 213 and the phase shifter 214 are each formed as part of a single chip made of electro-optical material. The transmitter 209 is adapted to produce quadrature phase modulated optical signals.

Figure 7:
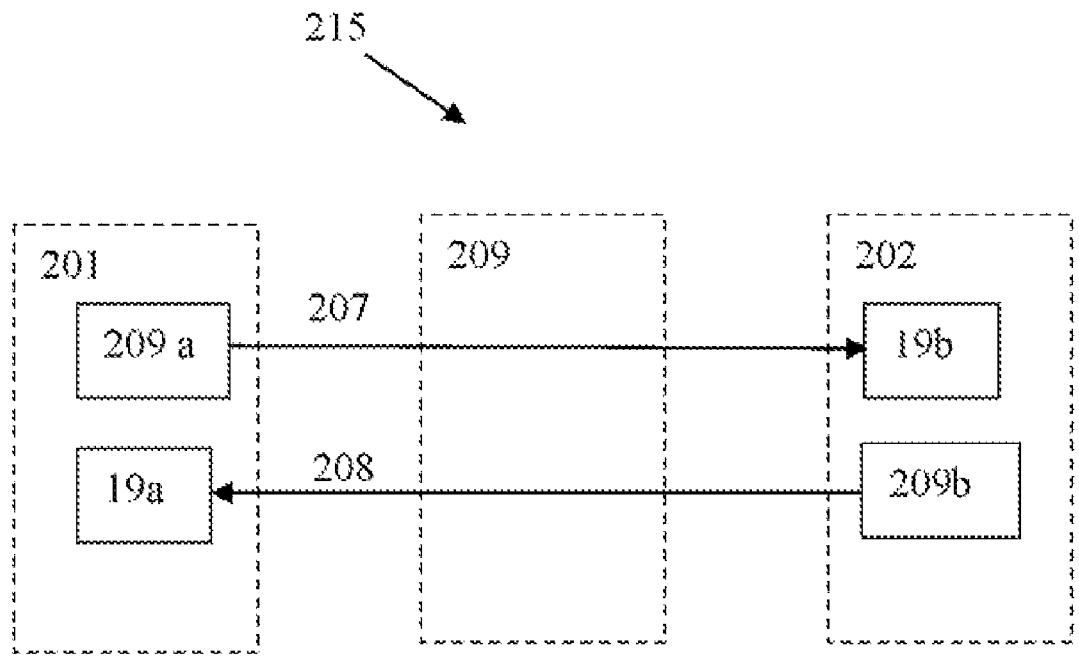
FIG. 7 is a schematic diagram of an optical communication system with a coherent optical receiver having an alignment system.

The communication system 215 with two quadrature phase modulated transmitters 209a and 209b, both similar to the transmitter 209 shown in FIG. 6, is illustrated in FIG. 7. The coherent receivers 19a and 19b (similar to the optical device 19 shown in FIG. 3) combined with local oscillators (not shown) are used to demodulation the data signal entering the receiver.

Figure 8:
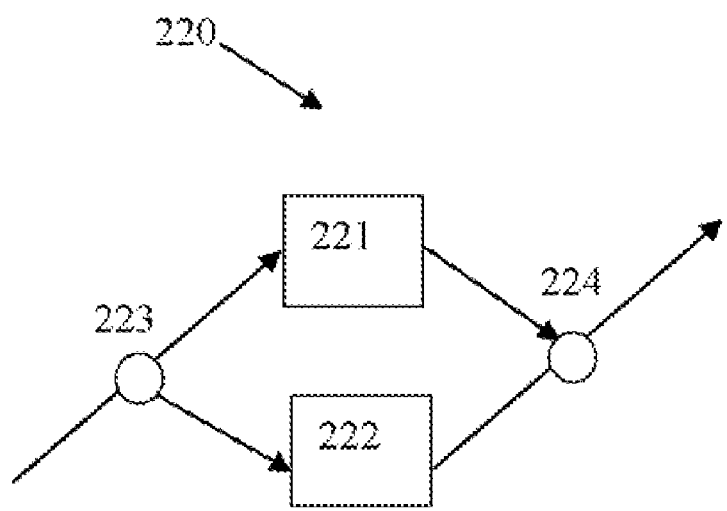
FIG. 8 is a schematic diagram of a quadrature modulator operating in two polarization states of light.

In another embodiment, quadrature modulator 220 illustrated in FIG. 8 is used as transmitter 203 and/or 204. It operates with the light in two (orthogonal) polarization states. The quadrature modulator, operating with two polarization states of light, is disclosed in the Ser. No. 10/613,722 and includes two quadrature modulators 221 and 222 integrated in one chip. Each modulator 221 and 222 operates with the light of one particular polarization state. A polarization beam splitter 223 is used to separate the light with orthogonal polarizations at the entrance of the device and direct each polarization light into a separate modulator. A combiner 224 is used to combine back after modulation the light with different polarizations. The resulting output signal consists of two quadrature-modulated signals, each of different (orthogonal) polarization. The quadrature modulator 221 and 222, the polarization beam splitter 223 and the combiner 224 are each formed as part of a single chip made of electro-optical material.

Figure 9:
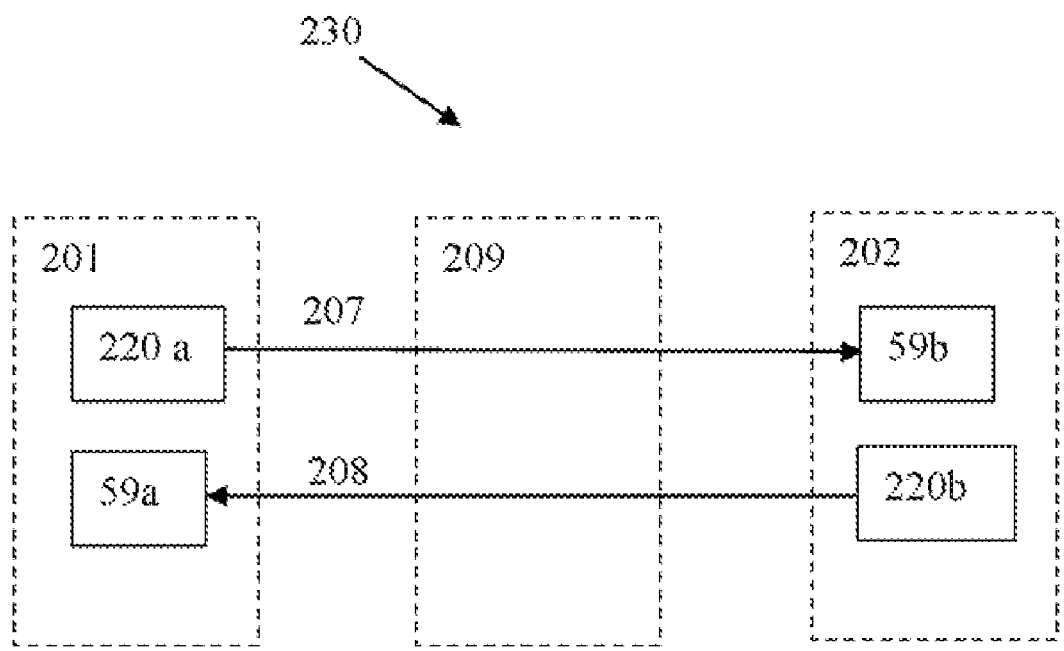
FIG. 9 is a schematic diagram of an optical communication system operating in two polarization states of light; the system uses a coherent optical having an alignment system.

The communication system 230 with two quadrature phase modulated transmitters 220a and 220b operating in two polarization states of light (both similar to the transmitter 220 shown in FIG. 8) are illustrated in FIG. 9. The coherent receivers 59a and 59b combined with local oscillators (not shown) are used to demodulation the data signal entering the receiver.

In one embodiment, communications system 230 is WDM bi-directional optical communications system is disclosed with at least 2 bits/s/Hz spectral efficiency using QAM modulation format and polarization-division-multiplexing. A return-to-zero (RZ) coding of the QAM signal is used to enhance transmission performance and receiver sensitivity. By way of illustration, and without limitation, the channel spacing can be 25 GHz. For fiber communications, a fiber bandwidth of approximately 200 nm (1450-1650 nm) can be utilized to provide a capacity of 100 Tbits/s or 0.1 Petabits/s using communications system 500 with 1000 wavelength channels. Coherent homodyne detection of the QAM channels, using analog and/or digital signal processing for polarization control as well as phase and frequency synchronization of the local laser, provides high receiver sensitivity performance.

If the input signal is amplified, for example by EDFA with added broadband ASE noise, the pulsed LO can perform time-domain filtering and suppress signal-spontaneous beat noise. This is not achievable with a spectral filter. The pulsed LO acts like an optical gate: when the pulsed LO is absent the photocurrent is very small or zero because the photocurrent is proportional to the square root of the product of the LO power and the signal power for balanced detection. Noise, such as ASE in the input signal, is cut off when the pulsed LO is off. ASE is reduced by the duty cycle of the pulsed LO. With pulsed LO of the present invention there is, among other things, (i) a reduced saturation effect of the photodetector compared to cw LO, (ii) an improvement in sensitivity due to higher peak power, (iii) an adaptation to coherent detection of OTDM signal, (iv) an adaptation to optical sampling, optical ADC, and optical demultiplexing, and the like.

Because the optical signal is down-converted linearly to the electrical baseband and digitized, digital processing methods used in RF systems can be utilized for implementation of the Optical Device of the present invention in DSP. In one specific embodiment, the Optical Device of the present invention is utilized for communication channel equalization and compensation for linear channel distortion, including but not limited to chromatic dispersion and PMD in fiber, for atmospheric effects in free space communications, and the like. In one embodiment, use of the Optical Device of the present invention provides an improvement of the signal BER due to the beam steering equalization when the equalization DSP is applied.

The foregoing description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

What is claimed is:

1. An integrated optical device, comprising: at least a first input and an alignment input, an optical interface having an interface circuit and a first alignment system both having integrated waveguides, the interface circuit and the first alignment system are adapted to operate at different non-overlapping time periods, the integrated waveguides of the interface circuit and the integrated waveguides of the first alignment system each having at least one output waveguide, the output waveguides of the interface circuit and the output waveguides of the first alignment system being essentially parallel each other, the first alignment system having at least one alignment waveguide to pass light from the alignment input to a first alignment system output, the first alignment waveguide having light intensity losses less than 2 dB, a receiving unit positioned adjacent to the optical interface with an accuracy of at least 10 micron in the direction essentially perpendicular the output waveguides, the receiving unit containing a receiving circuit and a second alignment system, the second alignment system having at least one photodetector positioned along the line of the first alignment system output waveguide, wherein the interface circuit and the first alignment system are each formed as part of a single planar chip.

2. The optical device of claim 1, wherein the accuracy of the receiving unit positioning is at least 1 micron.

3. The optical device of claim 1, wherein the accuracy of the receiving unit positioning is at least 0.1 micron.

4. The optical device of claim 1, wherein the photodetector is positioned adjacent to the first alignment system output.

5. The optical device of claim 1, wherein the second alignment system includes a receiving alignment waveguide connected to the photodetector, the receiving alignment waveguide having light intensity losses less than 2 dB.

6. The optical device of claim 1, wherein the receiving circuit and the second alignment system each formed as part of a single planar chip.

7. The optical device of claim 1, wherein the receiving circuit includes at least one photodiode.

8. The optical device of claim 1, wherein the optical device is an optical link device.

9. The optical device of claim 1, wherein the chip is a single piece of crystal.

10. The optical device of claim 1, wherein the chip is made of $LiNbO_3$ and $LiTaO_3$ cut at X, or Y, or Z planes.

11. The optical device of claim 1, wherein the chip material is a ferroelectric material.

12. The optical device of claim 1, wherein the chip material is a semiconductor material.

13. The optical device of claim 12, wherein the semiconductor material is selected from Si and InP.

14. The optical device of claim 1, wherein the optical interface comprises: a first coupler coupled to the first input, the first coupler producing at least a first and second outputs; a second coupler coupled to a second input, the second coupler producing at least a first and second outputs; a third coupler coupled to the first output of the first coupler and to the first output of the second coupler; a fourth coupler coupled to the second output of the first coupler and to the second output of the second coupler; first and second crossing waveguides with an angle selected to minimize crosstalk and losses between the first and second cross waveguides, the first crossing waveguide connecting one of the first or second outputs from the first coupler with an input of the fourth coupler, the second crossing waveguide connecting one of the first or second outputs from the second coupler with an input of the third coupler; a first phase shifter coupled to the first and second waveguides, the first and second waveguides connecting one of the outputs of the first or second coupler and one of the inputs of the third or fourth couplers.

15. The optical device of claim 14, wherein the optical device is an optical pointing device.

16. The optical device of claim 14, wherein the optical device is a tracking device.

17. The optical device of claim 14, further comprising: a second phase shifter coupled to the first and second waveguides, the first and second waveguides connecting one of the outputs of the first or second coupler and one of the inputs of the third or fourth coupler.

18. The optical device of claim 1, wherein the optical interface comprises: a first coupler coupled to the first input and producing at least a first and second output; a second coupler coupled to a second input and producing at least a first and second output; a third coupler coupled to the first output of the first coupler and to the first output of the second coupler; a fourth coupler coupled to the second output of the first coupler and to the second output of the second coupler; first and second crossing waveguides with an angle selected to minimize crosstalk and losses between the first and second cross waveguides, the first crossing waveguide connecting one of the first or second outputs from the first coupler with an input of the fourth coupler, the second crossing waveguide connecting one of the first or second outputs from the second coupler with an input of the third coupler; a first phase shifter coupled to first and second waveguides, the first and second waveguides connecting one of the outputs of the first or second coupler and one of the inputs of the third or fourth couplers, a fifth coupler coupled to the second input and producing at least a first and second output; a sixth coupler coupled to a third input and producing at least a first and second output; a seventh coupler coupled to the first output of the fifth coupler and to the first output of the sixth coupler, an eighth coupler coupled to the second output of the fifth coupler and to the second output of the sixth coupler, third and fourth crossing waveguides with an angle selected to minimize crosstalk and losses between the third and fourth cross waveguides, the third crossing waveguide connecting one of the first or second outputs from the fifth coupler with an input of the eight coupler, the second crossing waveguide connecting one of the first or second outputs from the sixth coupler with an input of the seventh coupler, a third phase shifter coupled to third and fourth waveguides, the third and fourth waveguides are connected to one of the outputs of the fifth or sixth coupler and one of the inputs of the seventh or eighth coupler, wherein the first, second, third, fourth, fifth, sixth, seventh and eighth couplers, the two sets of crossing waveguides and the phase shifters are each formed as part of a single planar chip made of an electro-optical material.

19. A method of data transmission, comprising:
transmitting a light beam from a transmitter to a receiver, the light beam being modulated with data;
directing the light beam to a first input of the receiver, the receiver further comprising an alignment input, an optical interface having an interface circuit and a first alignment system both having integrated waveguides, the interface circuit and the first alignment system are adapted to operate at different non-overlapping time periods, the integrated waveguides of the interface circuit and the integrated waveguides of the first alignment system each having at least one output waveguide, the output waveguides of the interface circuit and the output waveguides of the first alignment system being essentially parallel each other, the first alignment system having at least one alignment waveguide to pass an alignment light from the alignment input to a first alignment system output, the first alignment waveguide having light intensity losses less than 2 dB, a receiving unit positioned adjacent to the optical interface with an accuracy of at least 10 micron in the direction essentially perpendicular the output waveguides, the receiving unit containing a receiving circuit and a second alignment system, the second alignment system having at least one photodetector positioned along the line of the first alignment system output waveguide, wherein the interface circuit and the first alignment system are each formed as part of a single planar chip.

20. The method of claim 19, wherein the transmission is in free space.

21. The method of claim 19, wherein the transmission is with a fiber.

22. The method of claim 19, wherein the transmission is applied to a ladar application.

23. The method of claim 19, wherein the transmission is utilized for spectral analysis.

24. An optical communication system, comprising:
a transmitter; and
a receiver receiving an optical beam modulated with data from the transmitter, the receiver including:
at least a first input for receiving the optical beam and an alignment input, an optical interface having an interface circuit and a first alignment system both having integrated waveguides, the interface circuit and the first alignment system are adapted to operate at different non-overlapping time periods, the integrated waveguides of the interface circuit and the integrated waveguides of the first alignment system each having at least one output waveguide, the output waveguides of the interface circuit and the output waveguides of the first alignment system being essentially parallel each other, the first alignment system having at least one alignment waveguide to pass light from the alignment input to a first alignment system output, the first alignment waveguide having light intensity losses less than 2 dB, a receiving unit positioned adjacent to the optical interface with an accuracy of at least 10 micron in the direction essentially perpendicular the output waveguides, the receiving unit containing a receiving circuit and a second alignment system, the second alignment system having at least one photodetector positioned along the line of the first alignment system output waveguide, wherein the interface circuit and the first alignment system are each formed as part of a single planar chip.

25. An optical communication system of claim 24, wherein the receiver further comprises: a fifth coupler coupled to the second input and producing at least a first and second output; a sixth coupler coupled to a third input and producing at least a first and second output; a seventh coupler coupled to the first output of the fifth coupler and to the first output of the sixth coupler, an eighth coupler coupled to the second output of the fifth coupler and to the second output of the sixth coupler, third and fourth crossing waveguides with an angle selected to minimize crosstalk and losses between the third and fourth cross waveguides, the third crossing waveguide connecting one of the first or second outputs from the fifth coupler with an input of the eight coupler, the fourth crossing waveguide connecting one of the first or second outputs from the sixth coupler with an input of the seventh coupler, a third phase shifter coupled to third and fourth waveguides, the third and fourth waveguides are connected to one of the outputs of the fifth or sixth coupler and one of the inputs of the seventh or eighth coupler, wherein the first, second, third, fourth, fifth, sixth, seventh and eighth couplers, the two sets of crossing waveguides and the phase shifters are each formed as part of a single planar chip made of an electro-optical material.

26. An optical communication system, comprising: a transmitter transmitting an optical beam modulated with data to a receiver; the receiver including: a first coupler coupled to the first input and producing at least a first and second output; a second coupler coupled to the second input and producing at least a first and second output; a third coupler coupled to the first output of the first coupler and to the first output of the second coupler; a fourth coupler coupled to the second output of the first coupler and to the second output of the second coupler; first and second crossing waveguides with an angle selected to minimize crosstalk and losses between the first and second cross waveguides, the first crossing waveguide connecting one of the first or second Outputs from the first coupler with an input of the fourth coupler, the second crossing waveguide connecting one of the first or second outputs from the second coupler with an input of the third coupler; a first phase shifter coupled to the first and second waveguides, the first and second waveguide being connected to one of the outputs of the first or second coupler and one of the inputs of the third or fourth coupler, an alignment system, the alignment system including at least one waveguide and at least one photodetector, the first, second, third and fourth couplers, the two crossing waveguides, the phase shifter and the alignment system are each formed as part of a single planar chip made of an electro-optical material, wherein the transmitter comprises: a first Mach-Zehnder modulator that produces a first output; a second Mach-Zehnder modulator that produces a second output; a splitter coupled to the first and second Mach-Zehnder modulators; a combiner that combines the first and second outputs; and a phase shifter coupled to the first and second Mach-Zehnder modulators, wherein the-first Mach-Zehnder modulator, the second Mach-Zehnder modulator, the splitter, the combiner and the phase shifter are formed as part of a single planar chip made of electro-optical material.

27. An optical communication system, comprising: a transmitter transmitting an optical beam modulated with data to a receiver, the receiver including: a first coupler coupled to the first input and producing at least a first and second output; a second coupler coupled to the second input and producing at least a first and second output; a third coupler coupled to the first output of the first coupler and to the first output of the second coupler; a fourth coupler coupled to the second output of the first coupler and to the second output of the second coupler; first and second crossing waveguides with an angle selected to minimize crosstalk and losses between the first and second cross waveguides, the first crossing waveguide connecting one of the first or second outputs from the first coupler with an input of the fourth coupler, the second crossing waveguide connecting one of the first or second outputs from the second coupler with an input of the third coupler; a first phase shifter coupled to the first and second waveguides, the first and second waveguide being connected to one of the outputs of the first or second coupler and one of the inputs of the third or fourth coupler, an alignment system, the alignment system including at least one waveguide and at least one photodetector;

the receiver further comprises: a fifth coupler coupled to the second input and producing at least a first and second output; a sixth coupler coupled to a third input and producing at least a first and second output; a seventh coupler coupled to the first output of the fifth coupler and to the first output of the sixth coupler, an eighth coupler coupled to the second output of the fifth coupler and to the second output of the sixth coupler, third and fourth crossing waveguides with an angle selected to minimize crosstalk and losses between the third and fourth cross waveguides, the third crossing waveguide connecting one of the first or second outputs from the fifth coupler with an input of the eight coupler, the fourth crossing waveguide connecting one of the first or second outputs from the sixth coupler with an input of the seventh coupler, a third phase shifter coupled to third and fourth waveguides, the third and fourth waveguides are connected to one of the outputs of the fifth or sixth coupler and one of the inputs of the seventh or eighth coupler, the first, second, third, fourth, fifth, sixth, seventh and eighth couplers, the two sets of crossing waveguides, the phase shifters and the alignment system are each formed as part of a single planar chip made of an electro-optical material; wherein the transmitter comprises:

a first Mach-Zehnder modulator that produces a first MZ output; a second Mach-Zehnder modulator that produces a second MZ output; a third Mach-Zehnder modulator that produces a third MZ output; a fourth Mach-Zehnder modulator that produces a fourth MZ output; a first input splitter coupled to the first and second Mach-Zehnder modulators; a first phase shifter coupled to the first MZ and second MZ outputs; a first output combiner positioned to combine the first MZ and second MZ outputs from the first and second Mach-Zehnder modulators; a second input splitter coupled to the third and fourth Mach-Zehnder modulators; a second phase shift coupled to the third MZ and fourth MZ outputs; and a second output combiner positioned to combine the third MZ and fourth MZ outputs.

* * * * *